US012759840B2

(12) United States Patent
Guilani et al.

(10) Patent No.: US 12,759,840 B2
(45) Date of Patent: Oct. 13, 2026

(54) SYSTEM AND METHOD FOR DETERMINING SUSPENSION MEMBER ELONGATION

(71) Applicant: OTIS ELEVATOR COMPANY, Farmington, CT (US)

(72) Inventors: Bardia Guilani, Woodstock Valley, CT (US); Ergün Alkan, Schönefeld (DE); Andreas J. Diethert, Berlin (DE)

(73) Assignee: OTIS ELEVATOR COMPANY, Farmington, CT (US)

( * ) Notice: Subject to any disclaimer, the term of this patent is extended or adjusted under 35 U.S.C. 154(b) by 535 days.

(21) Appl. No.: 18/533,492

(22) Filed: Dec. 8, 2023

(65) Prior Publication Data

US 2025/0187872 A1 Jun. 12, 2025

(51) Int. Cl.
*B66B 5/00* (2006.01)

(52) U.S. Cl.
CPC .................................. *B66B 5/0025* (2013.01)

(58) Field of Classification Search
CPC ......... B66B 17/12; B66B 11/04; B66B 11/02; B66B 1/3492; B66B 5/0037; B66B 5/0018; B66B 5/0025
USPC .......................................................... 187/391
See application file for complete search history.

(56) References Cited

U.S. PATENT DOCUMENTS 7,540,357 B2 6/2009 Finn et al.
2002/0104716 A1 8/2002 Zaharia
2023/0278827 A1* 9/2023 Alkan .................. B66B 1/3492 187/394

OTHER PUBLICATIONS

Jian et al. (CN 112897271 B), an Elevator Counterpoise Safety Protection Device and Control Method of the Device (Year: 2022).*
Li et al. (CN 110963385 B), Motor Operation Monitoring Method and Device for Traction Drive Elevator (Year: 2021).*
Onodera (JP 2019038622 A), Elevator Control Device (Year: 2019).*
Kawashiri et al. (CN 103130065 B) Elevator Operation-managing System (Year: 2015).*
Tozawa (JP 2016169094 A) Elevator (Year: 2016).*
Hirose (JP 2021098578 A) Rope Abnormality Diagnostic System, Rope Abnormality Diagnostic Method, and Program (Year: 2021).*

* cited by examiner

*Primary Examiner* — Jorge L Carrasquillo
(74) *Attorney, Agent, or Firm* — Carlson, Gaskey & Olds, P.C.

(57) ABSTRACT

An apparatus and method for determining elongation of suspension members in an elevator system includes an elevator car that is supported for movement within a hoistway by at least one suspension member and a counterweight that is coupled to the elevator car with the at least one suspension member. A first sensor detects a presence of one of the counterweight and elevator car, and a second sensor determines a position of the other of the elevator car and counterweight within the hoistway in response to a detection signal generated by the first sensor. Elongation of the at least one suspension member is determined based on a change in the position of the elevator car or counterweight in the hoistway over time as determined in response to the detection signal.

20 Claims, 2 Drawing Sheets

AFTER ELONGATION

SYSTEM AND METHOD FOR DETERMINING SUSPENSION MEMBER ELONGATION

BACKGROUND

Elevator systems are in widespread use for carrying passengers between various levels in buildings, for example. Some elevator systems are traction-based in which a suspension assembly, sometimes referred to as roping, suspends the elevator car and a counterweight. The suspension assembly also facilitates movement of the elevator car when needed. Traditional suspension assemblies include round steel ropes. Some elevator systems have included other types of suspension members, such as flat belts or other types of ropes that have tension members encased in a compressible polymer jacket. Elongation of suspension members, especially coated suspension members, is an indication of life/retained breaking strength. As elongation occurs on a very small scale, it can be challenging to measure repeatedly and accurately.

SUMMARY

An illustrative example elevator system includes: at least one suspension member that supports an elevator car and facilitates movement of the elevator car in a hoistway; a counterweight coupled to the elevator car with the at least one suspension member; a first sensor that detects a presence of one of the counterweight and the elevator car; a second sensor that determines a position of the other of the counterweight and the elevator car within the hoistway in response to a detection signal generated by the first sensor; and a control system that determines elongation of the at least one suspension member based on a change in the position of the elevator car or the counterweight in the hoistway over time as determined in response to the detection signal.

In addition to one or more of the features described above, or as an alternative, the first sensor comprises a counterweight sensor that is positioned at a fixed location in the hoistway and detects a presence of the counterweight.

In addition to one or more of the features described above, or as an alternative, the second sensor comprises a car sensor for an absolute position reference system that determines a position of the elevator car.

In addition to one or more of the features described above, or as an alternative, the absolute position reference system includes a code tape extending along a wall of the hoistway located next to the elevator car and the car sensor comprises an absolute position sensor that moves with the elevator car and interacts with the code tape to determine a precise position of the elevator car within the hoistway.

In addition to one or more of the features described above, or as an alternative, the absolute position reference system records a precise position of the elevator car within the hoistway in response to each detection of the counterweight.

In addition to one or more of the features described above, or as an alternative, the control system compares the precise position of the elevator car in response to the detection signal generated by the counterweight sensor when the elevator car is in an initial installation state to the precise position of the elevator car in response to the detection signal generated by the counterweight sensor when the elevator car is in a subsequent operational state to determine elongation.

In addition to one or more of the features described above, or as an alternative, the first sensor comprises a car sensor that is positioned at a fixed location in the hoistway and detects a presence of the elevator car.

In addition to one or more of the features described above, or as an alternative, the second sensor comprises a counterweight sensor to determine a position of the counterweight.

In addition to one or more of the features described above, or as an alternative, the counterweight sensor comprises a reference tape associated with one of the counterweight and a hoistway wall and a camera associated with the other of the counterweight and the hoistway wall.

In addition to one or more of the features described above, or as an alternative, the fixed location comprises a lowest door zone, and wherein once the elevator car is stopped at the lowest door zone, the detection signal is generated to activate the camera.

An illustrative example elevator system includes: at least one suspension member that supports an elevator car and facilitates movement of the elevator car in a hoistway; a counterweight coupled to the elevator car with the at least one suspension member; a first sensor assembly that detects a presence of one of the counterweight and the elevator car, wherein the first sensor assembly comprises at least one first sensor mounted to a fixed location in the hoistway or to a first moveable object; a second sensor assembly that determines a position of the other of the elevator car and counterweight within the hoistway in response to a detection signal generated by the at least one first sensor, and wherein the second sensor assembly comprises a reference tape mounted to one of a fixed structure or a second moveable object, and at least one second sensor mounted to the other of the fixed structure or the second moveable object; and a control system that determines elongation of the at least one suspension member based on a change in the position of the elevator car or the counterweight in the hoistway over time as determined in response to the detection signal.

In addition to one or more of the features described above, or as an alternative, the first sensor comprises a counterweight sensor that is positioned at the fixed location in the hoistway and detects the presence of the counterweight; and the reference tape is mounted along a wall of the hoistway that comprises the fixed structure or is mounted to an outer surface of the second moveable object comprising the elevator car, and the at least one second sensor is mounted to the other of the wall of the hoistway or the outer surface of the second moveable object comprising the elevator car.

In addition to one or more of the features described above, or as an alternative, the detection signal causes the at least one second sensor to determine car position, which is then used to determine a change in car position over time, and wherein the counterweight and the elevator car are in motion during generation of the detection signal.

In addition to one or more of the features described above, or as an alternative, the at least one first sensor comprises a car sensor that is mounted to the first moveable object comprising the elevator car or is mounted to the fixed location comprising a wall of the hoistway, and detects the presence of the elevator car; and the reference tape is mounted to the fixed structure comprising a wall of the hoistway or to the second moveable object comprising the counterweight, and the at least one second sensor comprises a camera that is mounted to the other of the counterweight or the wall of the hoistway.

In addition to one or more of the features described above, or as an alternative, the car sensor triggers activation of the camera to determine a change in counterweight position over time, and wherein the elevator car is stationary at a specific location during generation of the detection signal.

An illustrative example method includes, wherein an elevator car is supported for movement within a hoistway by at least one suspension member and a counterweight is coupled to the elevator car with the at least one suspension member, the method comprising: detecting a presence of one of the counterweight and the elevator car with a first sensor; determining a position of the other of the elevator car and counterweight within the hoistway in response to a detection signal generated by the first sensor; and determining elongation of the at least one suspension member based on a change in the position of the elevator car or counterweight in the hoistway over time as determined in response to the detection signal.

In addition to one or more of the features described above, or as an alternative, the method includes having the counterweight and the elevator car be in motion during generation of the detection signal.

In addition to one or more of the features described above, or as an alternative, the method includes having the counterweight and the elevator stationary during generation of the detection signal.

In addition to one or more of the features described above, or as an alternative, the first sensor comprises a counterweight sensor and the second sensor comprises a car sensor for an absolute position reference system that determines a position of the elevator car, and the method including: positioning the first sensor at a fixed location in the hoistway to detect the presence of the counterweight; extending a code tape of the absolute position reference system along a wall of the hoistway located next to the elevator car; and mounting the car sensor to move with the elevator car and interact with the code tape to determine a precise position of the elevator car within the hoistway.

In addition to one or more of the features described above, or as an alternative, wherein the first sensor comprises a car sensor and the second sensor comprises a counterweight sensor to determine a position of the counterweight, and including: positioning the first sensor at a fixed location in the hoistway to detect the presence of the elevator car; providing the counterweight sensor as a reference tape associated with one of the counterweight and hoistway wall and a camera associated with the other of the counterweight and hoistway wall; and once the elevator is stopped at the fixed location, generating the detection signal to activate the camera to read the reference tape.

The various features and advantages of an example embodiment will become apparent to those skilled in the art from the following detailed description. The drawings that accompany the detailed description can be briefly described as follows.

DETAILED DESCRIPTION

Embodiments of this disclosure provide for a system and method of determining elongation of suspension members that is simple and cost effective.

Figure 1:
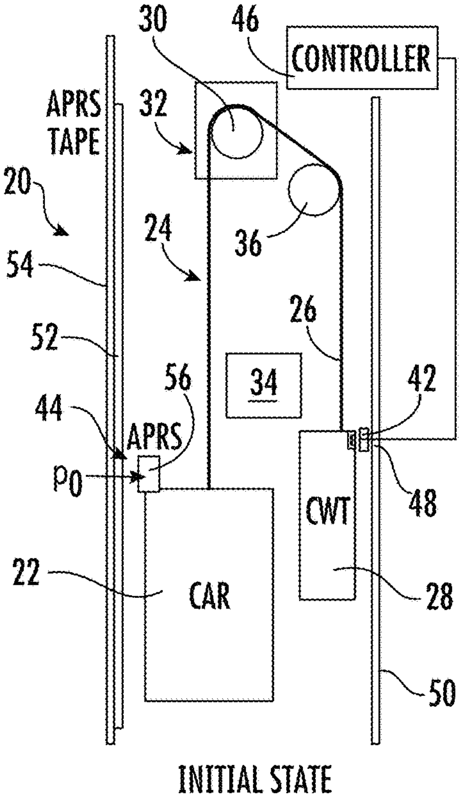
FIG. 1 schematically illustrates selected portions of an elevator system incorporating a system that determines suspension member elongation, wherein the system is in an initial state.
Figure 2:
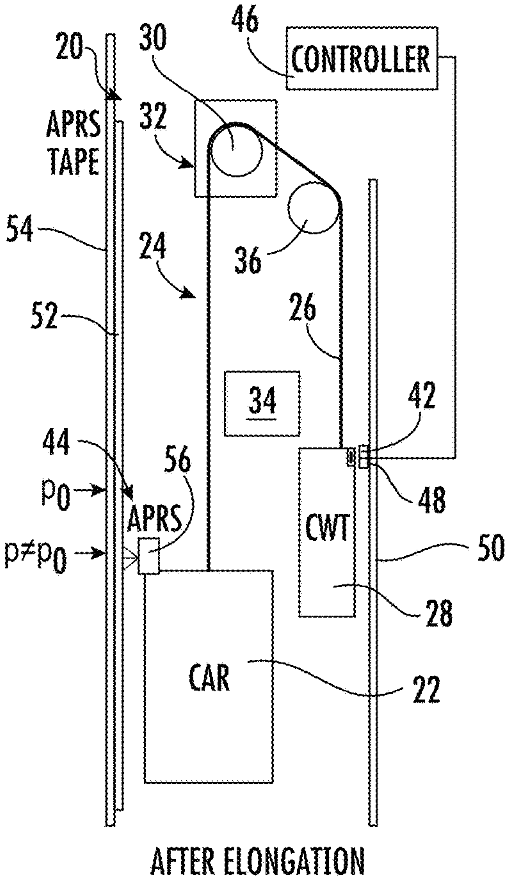
FIG. 2 is similar to FIG. 1 but shows the system in a state of elongation.
Figure 3:
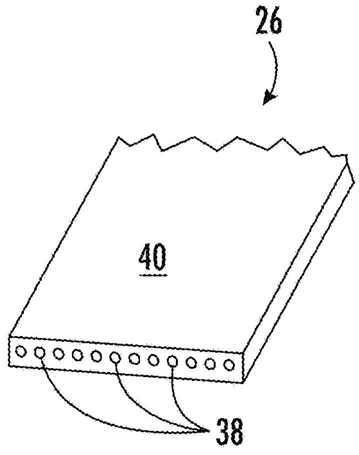
FIG. 3 schematically illustrates a portion of an example suspension member.

FIGS. 1-2 schematically illustrate selected portions of an elevator system 20. An elevator car 22 is supported by a roping arrangement or suspension assembly 24 that includes one or more suspension members 26. The elevator car 22 is coupled to a counterweight 28 by the suspension members 26. In one example, the suspension member 26 comprises coated ropes or coated steel belts where tension members 38 are encased in a compressible polymer jacket 40 as shown in FIG. 3.

A machine sheave 30 is associated with a machine encoder 32. The machine sheave 30 facilitates movement of the elevator car 22 within the hoistway 34. As the suspension members 26 move in response to rotation of the machine sheave 30, the elevator car 22 and counterweight 28 move vertically. The suspension members 26 may move around additional sheaves 36 as the elevator car 22 moves between landings or levels.

In one example, the machine sheave 30 supports the suspension member 26 at a location between the counterweight 28 and the elevator car 22. An elongation determining system includes at least a first sensor 42, e.g. a counterweight sensor, which detects a presence of the counterweight 28, and a second sensor 44, e.g. a car sensor, which detects the presence of the elevator car 22. A control system includes a drive/controller 46 that interacts with the first sensor 42 and the second sensor 44 to determine an amount of elongation, or change in length, of the suspension member 26 over time.

In one example, the first sensor 42 comprises a single discrete sensor positioned at a fixed location 48 in the hoistway 34. In one example, the first sensor 42 is positioned on a hoistway wall 50 on a counterweight side of the hoistway 34. In one example, the single discrete sensor comprises a limit switch, photoelectric sensor, proximity sensor, or similar sensing device; however, other types of detecting sensors could also be used.

In one example, the first sensor 42 can comprise an existing sensor that is already used in the elevator system 20. In one implementation, the existing sensor may comprise a sensor used to determine overtravel of the counterweight 28 as it contacts the buffer located in the hoistway pit.

In one example, the second sensor 44 comprises an absolute position reference system (APRS). Any type of APRS can be used and those skilled in the art who have the benefit of this description will be able to determine which type of APRS would be best suited for these purposes. In one example, the APRS includes a code tape 52 that is mounted to a wall 54 on a car side of the hoistway 34, and an APRS sensor 56 that moves with the elevator car 22. The code tape 52 extends along an entire length of the hoistway 34. The APRS sensor 56 moves with the elevator car 22 and interacts with the code tape 52 to determine an absolute or a precise position of the elevator car 22 within the hoistway 34. The APRS may include other components such as guide clips and position indicator clips (not shown) that can be used to mount the code tape and APRS sensor as needed.

The APRS can be used to determine the absolute position and velocity of the elevator car 22 by reading the fixed installed code tape 52 in the hoistway 34. The APRS transmits this information to the controller 46 using a specified communication interface. As known, the information of the absolute position is encoded on the code tape. In one example, the APRS sensor 56 is based on a dual camera system which scans the code tape 52 via infrared illumination to determine the position.

In one example, the APRS has a resolution of 1 mm or less. In another example, the APRS has a resolution of 0.5 mm.

As discussed above, the counterweight sensor 42 detects a presence of the counterweight 28 within the hoistway 34 and the car sensor 44 determines a position of the elevator car 22 within the hoistway 34 in response to a detection signal generated by the counterweight sensor 42. The controller 46 of the control system can then determine elongation of the suspension member 26 based on a change in the position of the elevator car 22 in the hoistway 34 over time as determined in response to the detection signal. Thus, the position information is generated each time the counterweight 28 is detected, and this position information is stored/recorded in the control system to determine elongation.

The suspension member 26 will stretch or elongate over time. During initial installation of the elevator car 22, the system will determine an initial position of the elevator car 22 in the hoistway in response to the detection signal generated by the counterweight sensor 42 as indicated at $p_0$ in FIGS. 1-2. As the suspension member 26 elongates overtime, the position of the elevator car 22 in the hoistway will change when the counterweight 28 position is detected by sensor 42 due to the increased length of the suspension member. This change in position is exemplified as $p>p_0$ in FIG. 2, specifically $\Delta p=p_1-p_0$.

Thus, the APRS records a precise position of the elevator car 22 within the hoistway 34 in response to each detection of the counterweight 28 by sensor 42 and then uses this information for comparison purposes. For example, the control system compares the precise position of the elevator car 22 in response to the detection signal generated by the counterweight sensor 42 when the elevator car 22 is in an initial installation state to the precise position of the elevator car 22 in response to the detection signal generated by the counterweight sensor 42 when the elevator car is in a subsequent operational state to determine elongation. The control system may generate an indicator signal when the elongation over time reaches a predetermined limit. In one example, the predetermined limit comprises retirement criteria that is based on the type of elevator and/or application of operation of the elevator. Those skilled in the art who have the benefit of this description will be able to determine the appropriate retirement criteria for each system.

The drive/controller 46 is part of the control system and includes one or more processors that are used to receive/record input data from the sensors 42, 44, and determine the elongation of suspension members 26. In one example, the processor includes one or more computing devices and associated memory. The processor is programmed or otherwise configured to use the different types of information to quantify the proportional relationship between the change in car position over time.

Figure 4:
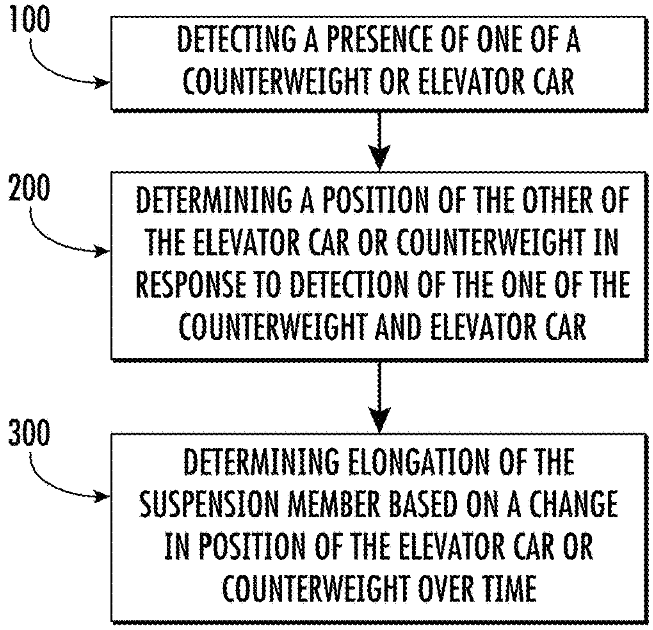
FIG. 4 is a flowchart diagram describing a method of determining elongation of suspension members in an elevator system.

As discussed above, suspension members 26 tend to elongate during use. This characteristic can be used for health monitoring of the suspension members 26 to determine the remaining life based on the amount of elongation. As shown in FIG. 4, the subject disclosure proposes a method of determining elongation. In one example, the method includes detecting a presence of the counterweight or elevator car with a first sensor as indicated at 100, and determining a precise position of one the elevator car or counterweight within the hoistway in response to a detection signal generated by detection of the other of the counterweight and elevator car as indicated at 200. Next, the method includes determining elongation of the at least one suspension member based on a change in the position of the elevator car or counterweight in the hoistway over time as determined in response to the detection signal as indicated at 300.

The method may also include any of the following steps either alone or in any combination thereof. For example, the method may include positioning the counterweight sensor 42 at any fixed location in the hoistway 34.

The method may include using an APRS to determine the precise position of the elevator car 22 within the hoistway 34, wherein the APRS includes a code tape 52 extending along a wall 54 of the hoistway 34 located next to the elevator car 22 and an APRS sensor that moves with the elevator car 22 and interacts with the code tape 52 to determine the precise position of the elevator car 22 within the hoistway 34.

The method may include recording the precise position of the elevator car 22 within the hoistway 34 in response to each detection of the counterweight 28.

The method may include comparing the precise position of the elevator car 22 in response to the detection signal generated by the counterweight sensor 42 when the elevator car 22 is in an initial installation state to the precise position of the elevator car 22 in response to the detection signal generated by the counterweight sensor 42 when the elevator car is in a subsequent operational state to determine elongation.

The method may include generating an indicator signal when the elongation over time reaches a predetermined limit.

Figure 5:
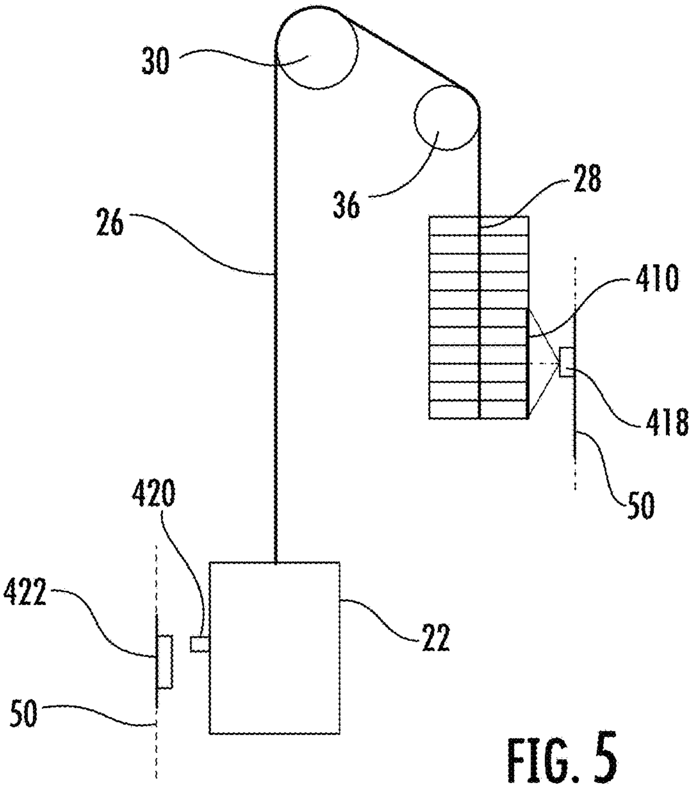
FIG. 5 schematically illustrates selected portions of an elevator system incorporating another system that determines suspension member elongation, wherein the system is in an initial state.
Figure 6A:
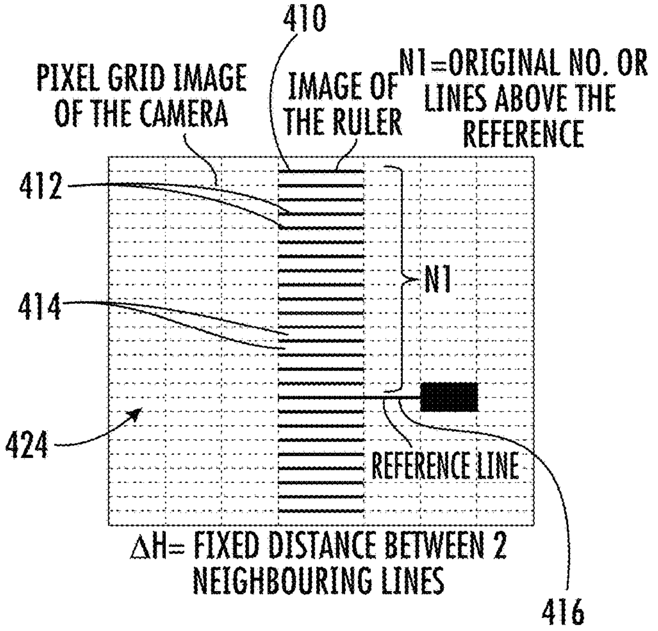
FIG. 6A shows the system of FIG. 5 in an initial state.
Figure 6B:
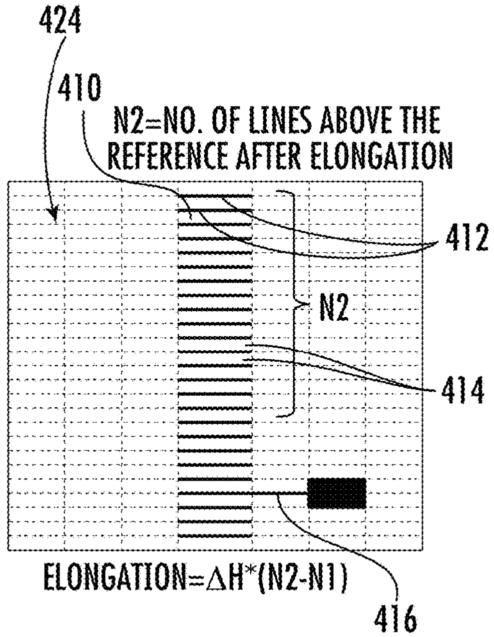
FIG. 6B is similar to FIG. 6A but shows the system in a state of elongation.

In another example shown in FIGS. 5 and 6A-B, a reference tape 410, e.g., a ruler tape, and a reference line 416 are used in combination with a sensor 418 that comprises at least one camera, for example. In one example, the reference tape 410, or ruler tape, comprises lines 412 having fixed intervals 414, e.g. ΔH, that comprises a fixed distance between two adjacent lines 412. The reference tape 410 can be installed on an outer surface of the counterweight 28 as shown in FIG. 5. In the example shown in FIG. 5, the sensor 418, e.g. the camera, is installed at a top of the hoistway and positioned in front of the reference tape 410 when the counterweight 28 is at the top of the hoistway. Optionally, the positions of the camera and reference tape may be switched.

At an initial installation, elevator car 22 is moved to the lowermost landing or floor and the camera is positioned in alignment with the reference line 416. The camera is able to determine a number of lines N1 (FIG. 6A) that are above the reference line 416 in this position. The number of lines above the reference line 416 will increase over time as additional measurements are taken. Each time a measurement is taken when the car 22 is moved to the lowermost landing, the camera will record the number of lines above the reference line 416 and this will result in an increased number of lines N2 (FIG. 6B), which can be equated to elongation.

In this example, the elevator car 22 includes a sensor assembly comprising a first member 420 that moves with the car 22 and a second member 422 that is fixed to the hoistway wall at a fixed location. In one example, the first member 420 comprises a door zone (DZ) switch and the second member 422 comprises a DZ magnet. However, other types of sensors could also be used. In one example, the first member 420 and second member 422 are located at the lowest possible DZ location, e.g., the lowermost landing or floor, and the camera 418 and reference tape 410 are located at a top of the hoistway.

In order to make sure that the elevator car 22 is always at the same position during each measurement, the elevator car 22 will be moved with slow speed until the available DZ switch is positioned in front of an edge of the lowest DZ magnet. The car 22 will be stopped at that position and then the camera will be triggered. In other words, once the presence of the car is detected at this location, the camera will be activated. As the camera is triggered, an image of the reference tape 410 falls on a pixel grid 424 of the camera. In one example, an image analyzing software counts the lines 412 above or below the reference line 416. The amount of elongation is determined by: AH times the number of lines between the initial and actual position of the reference line 416, e.g. elongation=$\Delta H*(N1-N2)$. FIG. 6A shows the initial position and FIG. 6B shows a subsequent position after a period of time has passed. The measurement is done regularly, e.g., a few times during a month. This makes it possible to accurately track the overall elongation as well as the elongation rate, while also making estimations on the actual status of the suspension member health to make predictions before a specified threshold is reached.

This example configuration is applicable for both roped and belted units, and has high accuracy compared to other solutions using switches on the counterweight side. The system is contactless and maintenance free, and provides continuous monitoring of elongation and associated rate of change during normal elevator operation.

In one example, a method comprises: detecting a presence of one of the counterweight and the elevator car with a first sensor; determining a position of the other of the elevator car and counterweight within the hoistway in response to a detection signal generated by the first sensor; and determining elongation of the at least one suspension member based on a change in the position of the elevator car in the hoistway over time as determined in response to the detection signal.

The method may include any of the following steps either along or in any combination. For example, the method may include having the counterweight and the elevator car be in motion during generation of the detection signal.

For example, the method may include having the counterweight and the elevator stationary during generation of the detection signal.

For example, the method may include wherein the first sensor comprises a counterweight sensor and the second sensor comprises a car sensor for an absolute position reference system that determines a position of the elevator car, and the method further including: positioning the first sensor at a fixed location in the hoistway to detect the presence of the counterweight; extending a code tape of the absolute position reference system along a wall of the hoistway located next to the elevator car; and mounting the car sensor to move with the elevator car and interact with the code tape to determine a precise position of the elevator car within the hoistway.

For example, the method may include wherein the wherein the first sensor comprises a car sensor and the second sensor comprises a counterweight sensor to determine a position of the counterweight, and the method further including: positioning the first sensor at a fixed location in the hoistway to detect the presence of the elevator car; providing the counterweight sensor as a reference tape associated with one of the counterweight and hoistway wall and a camera associated with the other of the counterweight and hoistway wall; and once the elevator is stopped at the fixed location, generating the detection signal to activate the camera to read the reference tape.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. An elevator system, comprising:

at least one suspension member that supports an elevator car and facilitates movement of the elevator car in a hoistway;

a counterweight coupled to the elevator car with the at least one suspension member;

a first sensor that detects a presence of one of the counterweight and the elevator car;

a second sensor that determines a position of the other of the counterweight and the elevator car within the hoistway in response to a detection signal generated by the first sensor; and a control system that determines elongation of the at least one suspension member based on a change in the position of the elevator car or the counterweight in the hoistway over time as determined in response to the detection signal.

2. The elevator system of claim 1, wherein the first sensor comprises a counterweight sensor that is positioned at a fixed location in the hoistway and detects a presence of the counterweight.

3. The elevator system of claim 2, wherein the second sensor comprises a car sensor for an absolute position reference system that determines a position of the elevator car.

4. The elevator system of claim 3, wherein the absolute position reference system includes a code tape extending along a wall of the hoistway located next to the elevator car and the car sensor comprises an absolute position sensor that moves with the elevator car and interacts with the code tape to determine a precise position of the elevator car within the hoistway.

5. The elevator system of claim 4, wherein the absolute position reference system records a precise position of the elevator car within the hoistway in response to each detection of the counterweight.

6. The elevator system of claim 5, wherein the control system compares the precise position of the elevator car in response to the detection signal generated by the counterweight sensor when the elevator car is in an initial installation state to the precise position of the elevator car in response to the detection signal generated by the counterweight sensor when the elevator car is in a subsequent operational state to determine elongation.

7. The elevator system of claim 1, wherein the first sensor comprises a car sensor that is positioned at a fixed location in the hoistway and detects a presence of the elevator car.

8. The elevator system of claim 7, wherein the second sensor comprises a counterweight sensor to determine a position of the counterweight.

9. The elevator system of claim 8, wherein the counterweight sensor comprises a reference tape associated with one of the counterweight and a hoistway wall and a camera associated with the other of the counterweight and the hoistway wall.

10. The elevator system of claim 9, wherein the fixed location comprises a lowest door zone, and wherein once the elevator car is stopped at the lowest door zone, the detection signal is generated to activate the camera.

11. An elevator system, comprising:

at least one suspension member that supports an elevator car and facilitates movement of the elevator car in a hoistway;

a counterweight coupled to the elevator car with the at least one suspension member;

a first sensor assembly that detects a presence of one of the counterweight and the elevator car, wherein the first sensor assembly comprises at least one first sensor mounted to a fixed location in the hoistway or to a first moveable object;

a second sensor assembly that determines a position of the other of the elevator car and counterweight within the hoistway in response to a detection signal generated by the at least one first sensor, and wherein the second sensor assembly comprises a reference tape mounted to one of a fixed structure or a second moveable object, and at least one second sensor mounted to the other of the fixed structure or the second moveable object; and a control system that determines elongation of the at least one suspension member based on a change in the position of the elevator car or the counterweight in the hoistway over time as determined in response to the detection signal.

12. The elevator system of claim 11, wherein:

the first sensor comprises a counterweight sensor that is positioned at the fixed location in the hoistway and detects the presence of the counterweight; and the reference tape is mounted along a wall of the hoistway that comprises the fixed structure or is mounted to an outer surface of the second moveable object comprising the elevator car, and the at least one second sensor is mounted to the other of the wall of the hoistway or the outer surface of the second moveable object comprising the elevator car.

13. The elevator system of claim 12, wherein the detection signal causes the at least one second sensor to determine car position, which is then used to determine a change in car position over time, and wherein the counterweight and the elevator car are in motion during generation of the detection signal.

14. The elevator system of claim 11, wherein:

the at least one first sensor comprises a car sensor that is mounted to the first moveable object comprising the elevator car or is mounted to the fixed location comprising a wall of the hoistway, and detects the presence of the elevator car; and the reference tape is mounted to the fixed structure comprising a wall of the hoistway or to the second moveable object comprising the counterweight, and the at least one second sensor comprises a camera that is mounted to the other of the counterweight or the wall of the hoistway.

15. The elevator system of claim 14, wherein the car sensor triggers activation of the camera to determine a change in counterweight position over time, and wherein the elevator car is stationary at a specific location during generation of the detection signal.

16. A method wherein an elevator car is supported for movement within a hoistway by at least one suspension member and a counterweight is coupled to the elevator car with the at least one suspension member, the method comprising:

detecting a presence of one of the counterweight and the elevator car with a first sensor;

determining a position of the other of the elevator car and counterweight within the hoistway in response to a detection signal generated by the first sensor; and determining elongation of the at least one suspension member based on a change in the position of the elevator car or counterweight in the hoistway over time as determined in response to the detection signal.

17. The method of claim 16, including having the counterweight and the elevator car be in motion during generation of the detection signal.

18. The method of claim 16, including having the counterweight and the elevator stationary during generation of the detection signal.

19. The method of claim 16, wherein the first sensor comprises a counterweight sensor and the second sensor comprises a car sensor for an absolute position reference system that determines a position of the elevator car, and including:

positioning the first sensor at a fixed location in the hoistway to detect the presence of the counterweight;

extending a code tape of the absolute position reference system along a wall of the hoistway located next to the elevator car; and mounting the car sensor to move with the elevator car and interact with the code tape to determine a precise position of the elevator car within the hoistway.

20. The method of claim 16, wherein the wherein the first sensor comprises a car sensor and the second sensor comprises a counterweight sensor to determine a position of the counterweight, and including:

positioning the first sensor at a fixed location in the hoistway to detect the presence of the elevator car;

providing the counterweight sensor as a reference tape associated with one of the counterweight and hoistway wall and a camera associated with the other of the counterweight and hoistway wall; and once the elevator is stopped at the fixed location, generating the detection signal to activate the camera to read the reference tape.

* * * * *